United States Patent Office 3,488,363
Patented Jan. 6, 1970

3,488,363
PREPARATION OF α-METHYLPHENYL ALANINES
David Frederick Hinkley, Plainfield, N.J., assignor to Merck & Co., Inc., Rahway, N.J., a corporation of New Jersey
No Drawing. Filed Oct. 22, 1965, Ser. No. 502,280
Int. Cl. C07d 13/10; C07c 99/00
U.S. Cl. 260—340.5                 6 Claims

ABSTRACT OF THE DISCLOSURE

Reaction of aroylhalides or aralkylhalides with an ester of α-nitropropionic acid forms α-nitro-α-methyl-β-oxo-β-phenylpropionate or α-nitro-α-methyl-β-phenylpropionate, respectively, either of which upon complete reduction gives the ester of a β-phenyl-α-methylalanine, that can be converted to the free acid by known means. The β-phenyl-α-methylalanines that can be prepared from the esters made by the novel process possess anti-hypertensive and tranquilizing properties.

---

This invention relates to a process for the preparation of α-methylphenylalanines.

More particularly, it relates to a process for the preparation of ring hydroxylated α-methylphenylalanines.

Still more particularly, the invention relates to processes for the production of intermediates in the procedures for producing hydroxylated phenylalanines by the reaction of aroyl or aralkyl halides with an ester of α-nitropropionic acid to form an α-nitro-α-methyl-β-arylpropionate and subsequently reducing the α-nitro ester to form an ester intermediate of a β-hydroxylated phenyl-α-methylalanine.

The compounds produced in accordance with the process of this invention are important intermediates in the production of certain optically active hydroxylated derivatives of α-methylphenylalanine. In particular, the compounds produced in accordance with the process of the present invention are esters of α-amino-α-methyl-β-(p-hydroxyphenyl)propionic acid, α-amino-α-methyl-β-(3,4-dimethoxyphenyl)propionic acid, α-amino-α-methyl-β-hydroxy-β-(p-hydroxyphenyl)propionic acid, and α-amino-α-methyl-β-hydroxy-β-(3,4-dimethoxyphenyl)propionic acid which are readily hydrolyzed to produce α-methyl-β-(3,4-dihydroxyphenyl)alanine, α-methyl-β-(p-hydroxyphenyl)alanine, α-methyl-β-hydroxy-β-(3,4-dihydroxyphenyl)alanine and α-methyl-β-hydroxy-β-(p-hydroxyphonyl)alanine as racemates or as optically inactive mixtures of diastereoisomers, in the case of the β-hydroxy compounds. Of the racemic mixtures set forth above, the 3,4-dihydroxyphenyl compounds are readily resolved to produce the L or natural forms thereof which are active in reducing the blood pressure of warm blooded animals. Thus, the L isomer of α-methyl-β-(3,4-dihydroxyphenyl)alanine, otherwise known as methyldopa, has been used in the treatment of hundreds of patients suffering from hypertension and, as such, has been sold on a commercial scale for use in such treatment.

In a similar manner, the racemic α-methyl-β-hydroxy-β-(3,4-dihydroxyphenyl)alanine is resolved to produce the corresponding L or natural isomer which has the property of reducing the blood pressure of warm blooded animals and, in addition, can be converted to the compound methyldopa by catalytic hydrogenation in the presence of a palladium catalyst.

The corresponding α-methyl-monohydroxyphenyl-alanine, i.e., α-methyl-p-tyrosine, is a useful candidate as a tranquilizer in the mental health field since this compound, when injected into animals preferentially prevents the accumulation of catecholamines in brain tissue without affecting the accumulation of these substances in the heart tissue of animals. This property is shared by many of the useful tranquilizer-type compounds. In each of the above instances, conversion of the racemic compound into the optically-active L-isomer can be accomplished by known methods of resolution of racemic mixtures into their optically active components.

The starting materials used in the process of my invention are substituted benzyl or benzoyl halides wherein the 3 and 4 positions of the phenyl ring contain either hydroxy, alkanoyloxy or alkoxy substituents, as indicated in the following formula:

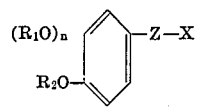

in which $R_1$ and $R_2$ are hydrogen, alkanoyl, alkyl and alkoxyalkyl when considered separately, and methylene when considered together as a single substituent; $n$ is an integer greater than $-1$ and less than $+2$; $Z$ is a methylene or a carbonyl radical; and $X$ is a halogen substituent having an atomic weight greater than 34 and less than 80.

The compounds preferred for use as starting materials in the process of my invention are the 3,4-disubstituted benzyl chlorides or benzyl bromides and the corresponding 4-substituted benzyl chlorides or bromides. Examples of such compounds are 3,4-dimethoxybenzyl chloride, 3,4-diethoxybenzyl chloride, 3,4-dipropoxybenzyl chloride, and the corresponding bromide compounds. A particularly preferred class of compounds for the preparation of α-methyl-β-hydroxy-β-(3,4-dihydroxyphenyl)-alanines are the alkoxy-substituted compounds such as 3,4-dimethoxybenzoyl chloride, 3,4-diethoxybenzoyl chloride, 3,4-dipropoxybenzoyl chloride and 3,4-di-i-propoxybenzoyl chloride, and the corresponding bromide compounds.

In accordance with the process of my invention, as outlined in the accompanying flow sheet:

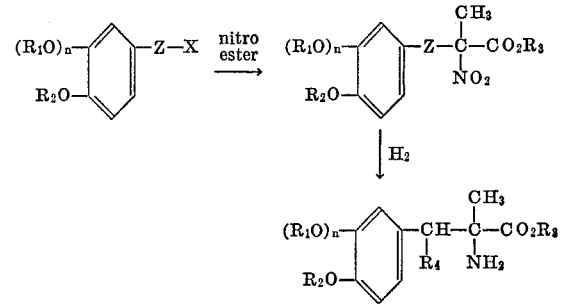

wherein:
$n = 0$ or $1$;
$R_1$ and $R_2 = H$, alkanoyl, alkyl and methylene when taken together as a single substituent;
$Z$ = methylene, carbonyl;
$X$ = halogen;
$R_3$ = lower alkyl of from 1–5 carbon atoms;
$R_4 = H$, OH the starting 4-substituted or 3,4-disubstituted benzyl halide or the corresponding benzoyl halide is intimately contacted, preferably in a liquid diluent, with approximately an equimolar amount of a lower alkyl ester of an α-nitropropionic acid to produce an α-nitro-α-methyl-β-(4-substituted or 3,4-disubstituted phenyl)propionic acid.

If the starting compound is a benzoyl halide, the resulting propionic acid contains in addition to the aforementioned substituents a double-bonded oxygen atom attached to the β-carbon of the propionic acid ester. The resulting nitro propionate is then reduced either by a chemical reducing agent in a liquid medium or by catalytic hydrogenation to reduce the nitro substituent to an amino substituent and produce the corresponding α-methyl-β-(4-substituted or 3,4-disubstituted phenyl)propionate ester which may be hydrolytically cleaved to the corresponding α-methyl-α-amino-β-(4-hydroxy or 3,4-dihydroxy phenyl)propionic acid.

In accordance with a further embodiment of my invention, by reduction of an α-nitropropionate ester having the formula:

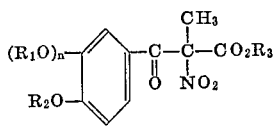

wherein the β-carbon contains a keto substituent, there is obtained as an intermediate product in the reduction process a lower alkyl ester of α-methyl-α-amino-β-hydroxy-β-(4-substituted or 3,4-disubstituted phenyl)propionic acid which is isolated or, alternatively, is further reduced to the α-methyl-β-(4-substituted or 3,4-disubstituted phenyl) alanines.

The first step of my process employes as one of the reactants a lower alkyl ester of α-nitropropionic acid. Typical esters which may effectively be employed are methyl α-nitropropionate, ethyl α-nitropropionate, propyl α-nitropropionate, butyl α-nitropropionate and amyl α-nitropropionate. In accordance with my process, in the first step of the reaction, the aralkyl or aroyl halide and the propionate ester are mixed in a liquid diluent. A preferred diluent for the reaction is one which acts as a solvent for the reactants and is inert under the conditions of the condensation reaction. Typical examples of such solvents are aromatic hydrocarbons such as toluene, xylene or benzene, toluene being preferred; N,N-dialkyl amides such as N,N-dimethyl formamide, N,N-dimethyl acetamide and N,N-diethyl acetamide; dimethyl sulfoxide; alcohols such as ethanol, methanol, propanol, isopropanol, butanol and the like; as well as ethers such as, for example, dioxane tetrahydrofuran, ethylene glycol dimethyl ether, and the like.

The reactants are preferably brought together at a temperature of less than room temperature, between about 0 and 5° C. and intimately mixed for a period of about 30 minutes to about 2 hours, after which the mixture is warmed to ensure completion of the reaction, and heated to reflux temperature, or up to about 150° C., for about 1 hour to produce the desired α-methyl-α-nitro-β-(4-substituted or 3,4-disubstituted phenyl)propionate ester. The product is then recovered by neutralization of the reaction mixture and removal of the solvent by evaporation under reduced pressure. The product is crystallized from the residue using mixtures of methanol and hexane or, alternatively, is recovered by extraction with a suitable solvent. The intermediate product isolated in this manner is a lower alkyl ester of an α-nitro-α-methyl-β-(4-substituted or 3,4-disubstituted phenyl)propionic acid.

In accordance with the process of my invention and utilizing the starting materials enumerated above as the preferred group, there are obtained as intermediates ethyl-α-nitro-α-methyl-β-(3,4-dimethoxyphenyl)propionate as well as the corresponding diethoxy, dipropoxy and dibutoxy esters; methyl-α-nitro-α-methyl-(3,4-dimethoxyphenyl)propionate as well as the corresponding diethoxy, dipropoxy and dibutoxy esters; propyl-α-nitro-α-methyl-β-(3,4-dimethoxyphenyl)propionate and the corresponding dimethoxy, diethoxy, dipropoxy and dibutoxy esters.

When the starting material utilized in the process of my invention is the corresponding benzoyl halide, the intermediate products obtained contain, in addition to the above-mentioned substituents, a keto group attached to the β-carbon of the α-nitropropionate esters listed above.

In the second step of the process of my invention, the formed α-nitropropionate ester is reduced to convert the nitro substituent to an amino substituent. In the instance of the intermediate α-nitropropionate derived from reaction with an aroyl halide, the reduction reaction, in addition to converting the nitro group to an amino group, reduces the keto function stepwise first to an hydroxy substituent and subsequently to a methylene substituent. The reduction reaction employed may be a catalytic reduction or, alternatively, may be a chemical reduction such as a metal in an acidic medium, for example, iron in acetic acid or hydrochloric acid, zinc in the presence of hydrochloric acid, or stannous fluoride in the presence of hydrochloric acid.

The reduction of the nitro group to the amino group is easily effected by such chemical methods. Thus, they are particularly effective in the conversion of the α-nitropropionate esters derived from the condensation of aralkyl halides with α-nitropropionic acid esters. Alternatively, the intermediates containing a β-carbonyl substituent are more readily reduced by a process of catalytic hydrogenation in the presence of Raney nickel or a noble metal catalyst. In the conversion of the formed α-nitro-β-ketone propionate esters to the corresponding α-amino-β-hydroxy esters or the substituted phenylalanine esters, it is preferred to carry out the hydrogenation at hydrogen pressures slightly greater than atmospheric pressure in the presence of a noble metal catalyst. Pressures in the order of 1–4 atmospheres of hydrogen are most effective in carrying out this conversion. In the event of the use of a Raney nickel catalyst, higher hydrogen pressures are preferred to effect the conversion of the nitro substituent to the amino substituent and the further conversion of the carbonyl substituent to a methylene substituent.

The catalyst employed in the hydrogenation is preferably a noble metal catalyst. Such catalysts include platinum oxide as well as platinum or palladium deposited on barium sulfate, and platinum or palladium deposited on alumina or charcoal.

Under the preferred conditions of the hydrogenation reaction the reaction is complete in approximately 5–6 hours and requires for the conversion of the nitro to the amino group approximately 4 moles of hydrogen per mole of starting ester and, in the event the starting ester contains a keto substituent on the β-carbon, an additional mole of hydrogen is required.

Following the hydrogenation reaction, the catalyst is removed by filtration and the product is recovered by removal of the acid vehicle by neutralization or by evaporation in vacuo and extraction of the product to methanol. The extract containing the product, α-amino-β-substituted phenylalanine ester, is recovered in crude form by evaporation of the solvent, leaving the product as a residue.

EXAMPLE 1

Methyl α-(3,4-dimethoxybenzoyl)-α-nitropropionate

To a suspension of 13.5 g. (0.25 mole) of sodium methylate in 250 ml. of toluene at 0° C. is added 33.25 g. (0.25 mole) of methyl α-nitropropionate in 50 ml. of toluene dropwise over 15 minutes at 0–5°. The slurry is stirred 30 minutes at 0° and then 50 g. (0.25 mole) of 3,40-dimethoxybenzoyl chloride in 100 ml. of toluene is added dropwise over one hour at 5–10° with external cooling. The mixture is warmed to room temperature and then refluxed for one hour. The slurry is cooled, filtered to remove salt, and stripped in vacuo to a residual gum. Dissolution in 350 ml. of hot methanol with addition of 650 ml. of hexane effects the crystallization of methyl α-(3,4-dimethoxybenzoyl)-α-nitropropionate which is recovered by filtration.

When this procedure is repeated and there is substituted for the 3,4-dimethoxybenzoyl chloride an equimolar amount of 4-hydroxy-3-methoxybenzoyl chloride, 4-methoxybenzoyl chloride, 3,4-dihhydroxybenzoyl chloride, or 4-hydroxybenzoyl chloride there are obtained, respectively, methyl α-(3-methoxy-4-hydroxybenzoyl)-α-nitropropionate, methyl α-(4-methoxybenzoyl)-α-nitropropionate, methyl α-(3,4-dihydroxybenzoyl)-α-nitropropionate and methyl α-(4-hydroxybenzoyl)-α-nitropropionate.

EXAMPLE 2

α-Methyl-3,4,-dimethoxyphenylalanine methyl ester

To 59.4 g. (0.2 mole) of methyl α-veratroyl-α-nitropropionate in 500 ml. of glacial acetic acid containing 3 g. of palladium on barium sulfate is added 4 moles of hydrogen under 3 atmospheres pressure at 25° C. (4 hrs.). The shaker is opened and 24 ml. of 70% perchloric acid added and a further mole of hydrogen added at 80°. The flask is cooled, the catalyst removed by filtration and the perchloric acid removed by precipitation as the potassium salt. The filtrate is stripped in vacuo to a residual gum which is dissolved in water and extracted with ether. Dissolution in methanol and precipitation with hexane gives substantially pure α-methyl-3,4-dimethoxyphenylalanine methyl ester.

The procedure is repeated using as starting materials is place of the methyl α-veratroyl-α-nitropropionate an equimolar amount of the compounds obtained in accordance with the second paragraph of Example 1. The products isolated are, respectively, methyl α-amino-α-(3-methoxy-4-hydroxybenzyl)propionate, methyl α-amino-α-(4-methoxybenzyl)propionate, methyl α-amino-α-(3,4-dihydroxybenzyl)propionate and methyl α-amino-α-(4-hydroxybenzyl)propionate.

EXAMPLE 3

α-Methyl-β-hydroxy-3,4-dimethoxyphenylalanine methyl ester

To 59.4 g. of methyl α-veratroyl-α-nitropropionate dissolved in 500 ml. of glacial acetic acid is added 3 g. of palladium on barium sulfate catalyst and the entire mixture is shaken under hydrogen at a pressure of about 3 atmospheres at 25° C. for about 4 hours. The catalyst is removed by filtration and the filtrate containing the reduced product is evaporated under reduced pressure to remove the acetic acid and the residue dissolved in 200 ml. of methanol. The product is precipitated from the methanol solution by the addition of hexane. The product obtained in this manner is substantially pure α-methyl-β-hydrovy - 3,4 - dimethoxyphenylalanine methyl ester.

EXAMPLE 4

Methyl α-(3,4-dimethoxybenzyl)-α-nitropropionate

To a suspension of 13.5 g. (0.25 mole) of sodium methoxide in 250 ml. of toluene at 0° C. is added 33.25 g. (0.25 mole) of methyl α-nitropropionate in 50 ml. of toluene dropwise over 15 minutes at 0–5°. The slurry is stirred 30 minutes at 0° and then 46.6 g. (0.25 mole) of 3,4-dimethoxybenzyl chloride in 100 ml. of toluene is added dropwise over an hour at 5–10°. The mixture is then refluxed for one hour, cooled, filtered to remove salt and evaporated in vacuo to a residual gum. Dissolution in 200 ml. of hot methanol followed by 400 ml. of hexane and cooling gives crystalline methyl α-(3,4-dimethoxybenzyl)-α-nitropropionate.

The above procedure is repeated by substituting for the 3,4-dimethoxybenzyl chloride an equimolar amount of 3-methoxy - 4 - hydroxybenzyl chloride, 4 - methoxybenzyl chloride, 3,4 - dihydroxybenzyl chloride and 4 - hydroxybenzyl chloride. The products obtained, respectively, by this procedure are methyl α - 3 - methoxy - 4 - hydroxybenzyl) - α - nitropropionate, methyl α - 4 - methoxybenzyl) - α - nitropropionate, methyl α - 3,4 - dihydroxybenzyl) - α - nitropropionate and methyl α - (4 - hydroxybenzyl)-α-nitropropionate.

EXAMPLE 5

Methyl α-(3,4-dimethoxybenzyl)-α-aminopropionate

To a slurry of 39.1 g. of iron powder in 250 ml. of water and 25 ml. of water preheated to 85° under nitrogen is added a solution of 56.6 g. (0.2 mole) of methyl α-(3,4-dimethoxybenzyl)-α-nitropropionate in 350 ml. of toluene and 20 ml. of acetic acid over 4 hours with vigorous stirring. The resulting slurry is cooled to 40° and filtered through filter-aid. The filtrate layers are separated and the toluene layer containing the product concentrated in vacuo to minimum volume. Addition of 200 ml. of methanol and 300 ml. of hexane gives methyl α-(3,4-dimethoxybenzyl)-α-aminopropionate.

The above procedure is repeated substituting in place of methyl α - (3,4 - dimethoxybenzyl) - α - nitropropionate an equimolar amount of the products obtained in accordance with the procedures of the second paragraph of Example 4. The products obtained in this manner are methyl α - (3 - methoxy - 4 - hydroxybenzyl) - α - aminopropionate, methyl α - (4 - methoxybenzyl) - α - aminopropionate, methyl α - (3,4 - dihydroxybenzyl) - α - aminopropionate and methyl α - (4 - hydroxybenzyl) - α-aminopropionate.

What is claimed is:

1. The process which comprises heating a mixture comprising a solvent, a compound having the formula

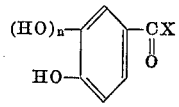

wherein $n$ is a whole integer greater than $-1$ and less than $+2$ and X is chloro or bromo, and a lower alkyl ester of α-nitropropionic acid in the presence of a strong base to form a compound of the formula:

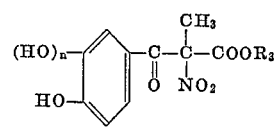

wherein $n$ is as defined above and $R_3$ is lower alkyl, and contacting said compound with hydrogen in the presence of a noble metal catalyst until 2 moles of hydrogen per mole of compound are absorbed to produce a compound of the formula:

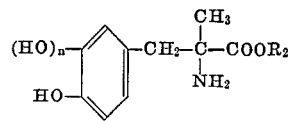

wherein $n$ and $R_3$ are as defined above.

2. The process which comprises heating a mixture comprising a solvent, a compound having the formula:

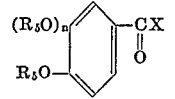

wherein $R_5$ is lower alkanoyl, $n$ is a whole integer greater than $-1$ and less than $+2$ and X is chloro or bromo, and a lower alkyl ester of α-nitropropionic acid in the presence of a strong base to form a compound of the formula:

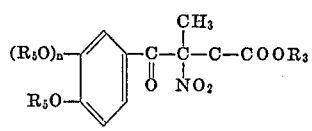

wherein $n$ and $R_5$ are as defined above and $R_3$ is lower alkyl, and contacting said compound with hydrogen in the presence of a noble metal catalyst until 2 moles of hydrogen per mole of compound are absorbed to produce a compound having the formula:

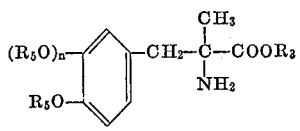

wherein $n$, $R_3$ and $R_5$ are as defined above.

3. The process which comprises heating a mixture comprising a solvent, a compound having the formula:

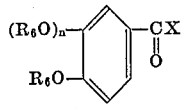

wherein $R_6$ is lower alkyl, $n$ is a whole integer greater than −1 and less than +2 and X is chloro or bromo, and a lower alkyl ester of α-nitropropionic acid in the presence of a strong base to form a compound of the formula:

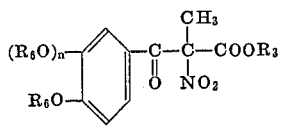

wherein $n$ and $R_6$ are as defined and $R_3$ is lower alkyl, and contacting said compound with hydrogen in the presence of a noble metal catalyst until 2 moles of hydrogen per mole of compound are absorbed to produce a compound having the formula:

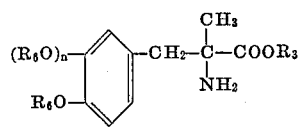

wherein $n$, $R_3$ and $R_6$ are defined above.

4. The process which comprises heating a mixture comprising a solvent, a compound having the formula:

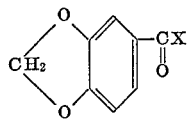

wherein X is chloro or bromo, and a lower alkyl ester of α-nitropropionic acid in the presence of a strong base to form a compound of the formula:

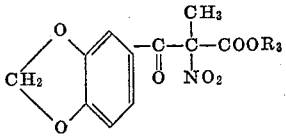

wherein $R_3$ is lower alkyl, and contacting said compound with hydrogen in the presence of a noble metal catalyst until 2 moles of hydrogen per mole of compound are absorbed to produce a compound having the formula:

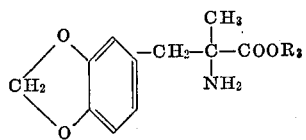

where $R_3$ is as defined above.

5. The process which comprises heating a mixture of solvent, a compound having the formula:

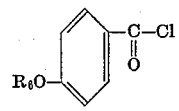

wherein $R_6$ is a lower alkyl substituent, with a lower alkyl ester of α-nitropropionic acid in the presence of a strong base to form a compound of the formula:

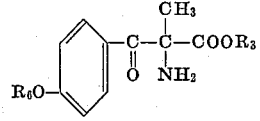

wherein $R_6$ is as defined above and $R_3$ is a lower alkyl substituent, and contacting said compound with hydrogen in the presence of a noble metal catalyst until 2 moles of hydrogen per mole of compound are absorbed to produce a compound having the formula:

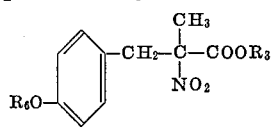

wherein $R_6$ is as defined above.

6. The process which comprises heating a mixture of solvent, a compound having the formula:

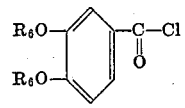

wherein $R_6$ is a lower alkyl substituent, with a lower alkyl ester of α-nitropropionic acid in the presence of a strong base to form a compound of the formula:

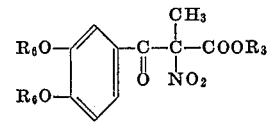

wherein $R_6$ is as defined above and $R_3$ is a lower alkyl substituent, and contacting said compound with hydrogen in the presence of a noble metal catalyst until 2 moles of hydrogen per mole of compound are absorbed to produce a compound having the formula:

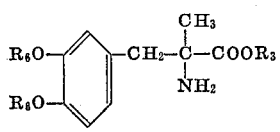

wherein $R_6$ is as defined above.

References Cited

UNITED STATES PATENTS 2,528,928   11/1950   Weisblat et al.

OTHER REFERENCES

Fieser & Fieser: Organic Chemistry, 3d ed., 1958, Reinhold Publishing Corp., London, pp. 543, 544.

ALEX MAZEL, Primary Examiner

J. H. TURNIPSEED, Assistant Examiner

U.S. Cl. X.R.

260—471, 519, 999

UNITED STATES PATENT OFFICE
CERTIFICATE OF CORRECTION

Patent No. 3,488,363           Dated January 6, 1970

Inventor(s) David Frederick Hinkley

It is certified that error appears in the above-identified patent and that said Letters Patent are hereby corrected as shown below:

Column 1, line 49, droxyphonyl... should read "droxyphenyl".

Column 5, line 23, replace the word ...is... with "in".

Column 5, line 71, ...α-3-... should read "α-(3-".

Column 5, line 72, ...α-4-... should read "α-(4-".

Column 5, line 73, ...α-3,4-... should read "α-(3,4-".

Column 6, line 50 (Claim 1, third structure), $-COOR_2$ should read "$-COOR_3$".

Column 6, line 69 (Claim 2, second structure), ...$-C-C-C-COOR_3$... should read "$-C-C-COOR_3$".

Column 7, line 28 (Claim 3), insert the word "above" following defined and preceding and $R_3$.

Column 8, line 13 (Claim 5, second structure), ...$NH_2$... should read "$NO_2$".

Column 8, line 24 (CLaim 5, third structure), ...$NO_2$... should read "$NH_2$".

Signed and sealed this 13th day of April 1971.

(SEAL)
Attest:

EDWARD M. FLETCHER, JR.       WILLIAM E. SCHUYLER, JR.
Attesting Officer                Commissioner of Patents